(12) United States Patent
Keda

(10) Patent No.: US 7,708,486 B2
(45) Date of Patent: May 4, 2010

(54) AIRTIGHT CAP STRUCTURE

(75) Inventor: Tadashi Keda, Kawagoe (JP)

(73) Assignee: Kotobuki & Co., Ltd., Kawagoe-shi, Saitama-ken (JP)

( * ) Notice: Subject to any disclaimer, the term of this patent is extended or adjusted under 35 U.S.C. 154(b) by 1014 days.

(21) Appl. No.: 11/185,018

(22) Filed: Jul. 20, 2005

(65) Prior Publication Data
US 2006/0027518 A1 Feb. 9, 2006

(30) Foreign Application Priority Data
Jul. 21, 2004 (JP) ............................ 2004-213349

(51) Int. Cl.
*B43K 23/12* (2006.01)
(52) U.S. Cl. .................... 401/247; 401/202; 401/243
(58) Field of Classification Search ............... 401/247, 401/98, 262, 269, 6, 202, 243
See application file for complete search history.

(56) References Cited
U.S. PATENT DOCUMENTS

| | | | | |
|---|---|---|---|---|
| 3,802,788 A | * | 4/1974 | Danjczek | 401/194 |
| 4,643,605 A | * | 2/1987 | Iwasaki | 401/243 |
| 5,066,156 A | * | 11/1991 | Petrillo et al. | 401/213 |
| 5,154,526 A | * | 10/1992 | Bothe | 401/258 |
| 5,762,435 A | * | 6/1998 | Fukushima | 401/213 |
| 6,062,753 A | * | 5/2000 | Hadtke et al. | 401/6 |
| 6,464,420 B2 | * | 10/2002 | Brunetti | 401/202 |
| 2004/0028453 A1 | * | 2/2004 | Kanari et al. | 401/109 |
| 2004/0052571 A1 | * | 3/2004 | Furukawa et al. | 401/243 |

FOREIGN PATENT DOCUMENTS
JP 9-30187 2/1997

* cited by examiner

*Primary Examiner*—David J Walczak
(74) *Attorney, Agent, or Firm*—McGinn Intellectual Property Law Group, PLLC

(57) ABSTRACT

An airtight cap structure is provided, in which the number of parts is not increased, and moreover, a design property can be given, and air-tightness can be secured.

A cap is configured by two-color molding of a soft portion comprised of an elastic soft resin, and a hard portion comprised of a hard resin, and in a state in which the cap is attached to a main body, the use end portion is inserted into the elastic soft portion to mare a direct contact to be sealed, and at the same time, the surface of the tip end portion of the main body is brought into contact with the soft portion, thereby securing air-tightness of a refill.

5 Claims, 5 Drawing Sheets

AIRTIGHT CAP STRUCTURE

BACKGROUND OF THE INVENTION

1. Field of the Invention

The present invention relates to an airtight cap structure with a use end portion detachably covered by a cap to prevent drying out of the use end portion of a writing tool, cosmetics, and the like.

2. Description of the Related Art

Heretofore, as a cap structure of this type, for example, the cap structure as disclosed in Japanese Patent Laid-Open No. 9-30187 has been known. The cap structure disclosed in this patent publication is a cap structure for a low viscosity ink writing tool, and the cap comprises an outer cap and a cupped sealing body which is fixed inside the outer cap and comprised of an elastic material. When the cap is attached a free end peripheral edge portion of the sealing body is allowed to be appressed to a tip end surface of a shaft barrel.

SUMMARY OF THE INVENTION

However, according to the cap structure as disclosed in Japanese Patent Laid-Open No. 9-30187, since it comprises an outer cap and a sealing body, there is an advantage in that a degree of freedom can be given to the material and the shape of the outer cap. Nevertheless, there is a problem in that the number of parts required is increased.

The present invention has been made in view of the above described problems, and an object of the invention is to provide an airtight cap structure capable of having a design property and securing air-tightness without increasing the number of parts.

To achieve the above described object, in the airtight cap structure in which a cap detachably covers a use end portion provided in an end portion of a main body so as to prevent drying out of the use end portion, the present invention is characterized in that at lease one of the cap and a vicinity of the use end portion of the main body is configured by two-color injection molding of a soft portion comprised of an elastic soft resin and a hard portion comprised of a hard resin, and the soft portion of the one of the cap and the vicinity of the use end portion of the main body is brought into contact with a corresponding surface of the other of the cap and the main body so as to secure air-tightness in a state in which the cap is attached to the main body.

According to the present invention, since the soft portion shaped by two color molding of at least one of the cap and the vicinity of the use end portion of the main body is brought into contact with the other corresponding surface, both of them can be brought into close contact, thereby reliably securing air-tightness without increasing the number of parts.

Further, the two-color molding can enhance the design property of the cap and the like.

Further, simply putting the cap on the main body allows both the cap and the main body to be brought into contact with each other even under the situation where the cap is unable to manually cover the main body, therefore, it is possible to secure air-tightness.

The soft portion can configure internal and external surface portions of the top portion of the cap.

The soft portion can configure a part of the internal surface portion of the cap and a part of the external surface portion of the cap, and the internal surface portion and the external surface portion can be connected with each other trough a communicating portion which penetrates into the hard portion.

Since the soft portion is exposed to the external surface portion by two-color molding so as to configure the external appearance of the cap, it is possible to enhance a design property of the cap by appropriately setting a shape, a color, and the like of the exposed portion of this soft portion.

Both the cap and the vicinity of the use end portion of the main body can be respectively configured by two color molding of the soft portion and the hard portion, and the soft portions of both of them are mutually bought into contact with each other so as to secure air-tightness. Thus, both of them can be closely contacted, and it is possible to secure air-tightness of the use end portion more reliably.

The present disclosure relates to subject matter contained in Japanese Patent Application No. 2004-213349, filed on Jul. 21, 2004, which is expressly incorporated herein by reference in its entirety.

DETAILED DESCRIPTION OF THE PREFERRED EMBODIMENTS

Embodiments of the present invention will be described below with reference to the drawings.

Figure 1:
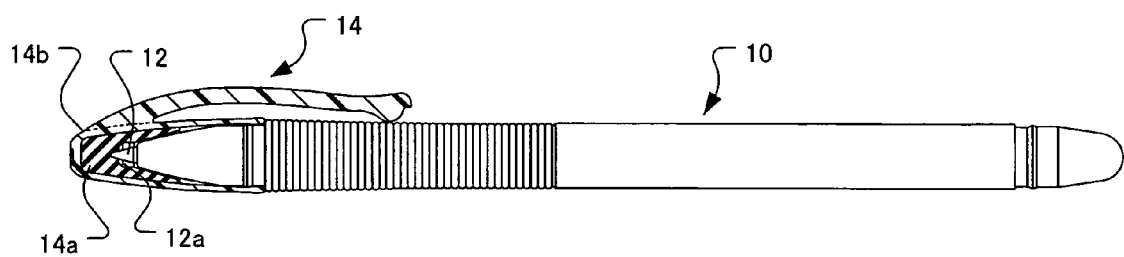
FIG. 1 is a partially sectional whole view of a writing tool adapting an airtight cap structure according to a first embodiment of the present invention.
Figure 2:
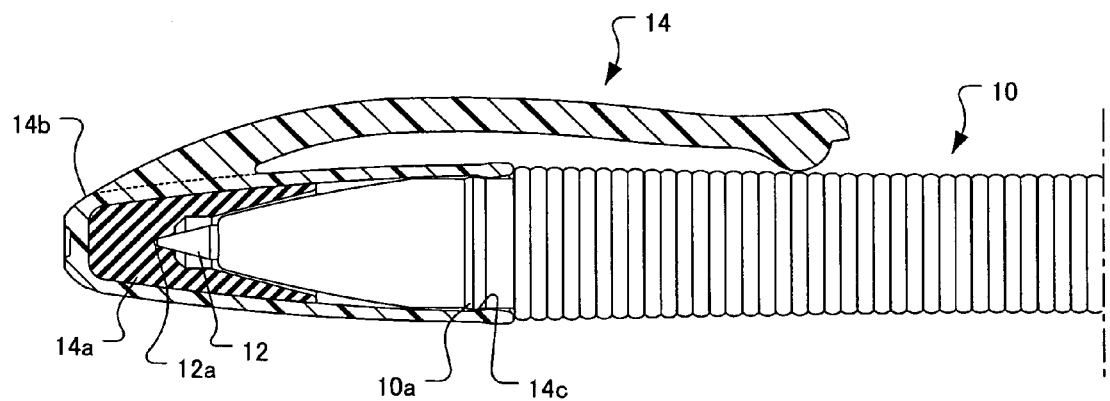
FIG. 2 is an enlarged vertical sectional view of the airtight cap structure of FIG. 1.

FIGS. 1 and 2 are views showing an example of adapting an airtight cap structure according to a first embodiment of the present invention to a writing tool. In the Figures, the writing tool includes a main body 10, and the main body 10 has a refill 12 as a writing body in its interior. In the tip end portion of the main body 10, a use end portion 12a of the tip end of the refill 12 is exposed.

When the refill 12 is not used, a cap 14 covers the use end portion 12a and the tip end of the main body 10 in order to prevent drying out of the use end portion 12a so as to protect the use end portion 12a.

The cap 14 is configured by two-color injection molding of a soft portion 14a comprised of an elastic soft resin and a hard portion 14b comprised of a hard resin. In this example, the soft portion 14a configures only one portion of the internal surface portion of the cap 14, and the hard portion 14b configures the other portion of the cap 14 including a grip portion.

The internal surface in the vicinity of a free end portion of the hard portion 14b is formed with a circular engaging protrusion 14c, and this circular engaging protrusion 14c can engage with a circular engaging portion 10a formed in the corresponding portion of the main body 10.

The soft portion 14a and the hard portion 14b that are two-color molded can be arbitrarily combined. For example, polypropylene, ABS or acryl resin can be used for the hard portion 14b, and thermoplastic elastomer can be used for the soft portion 14a.

In the cap structure configured as described above, when the use end portion 12a is not used and the cap 14 is attached to it, the engaging protrusion 14c of the hard portion 14b is engaged with the engaging portion 10a and the attaching state can be maintained. In this state, the use end portion 12a is inserted into the elastic soft portion 14a so as to make a direct contact to be sealed, and at the same time, the surface of the tip end portion of the main body 10 is brought into contact with the soft portion 14a so as to be closely contacted, thereby securing air-tightness of the refill 12.

In this way, since the cap 14 is a molded profile by two-color molding, air-tightness of the refill 12 can be secured by the soft portion 14a without increasing the number of parts, and at the same time, the shape of the hard portion 14b can be arbitrarily formed, thereby giving it a design property.

Figure 3:
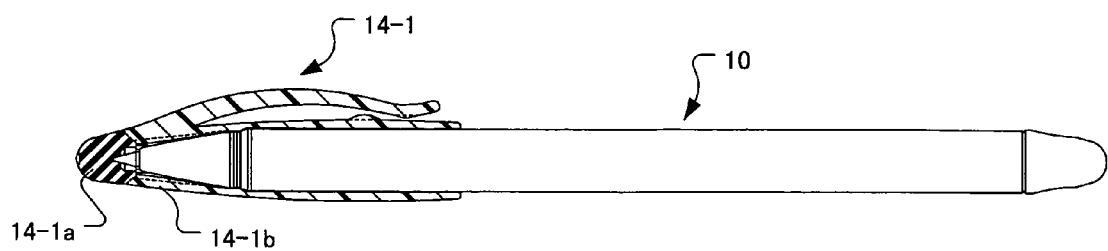
FIG. 3 is a partially sectional whole view of a writing tool adapting an airtight cap structure according to a second embodiment of the present invention.
Figure 4:
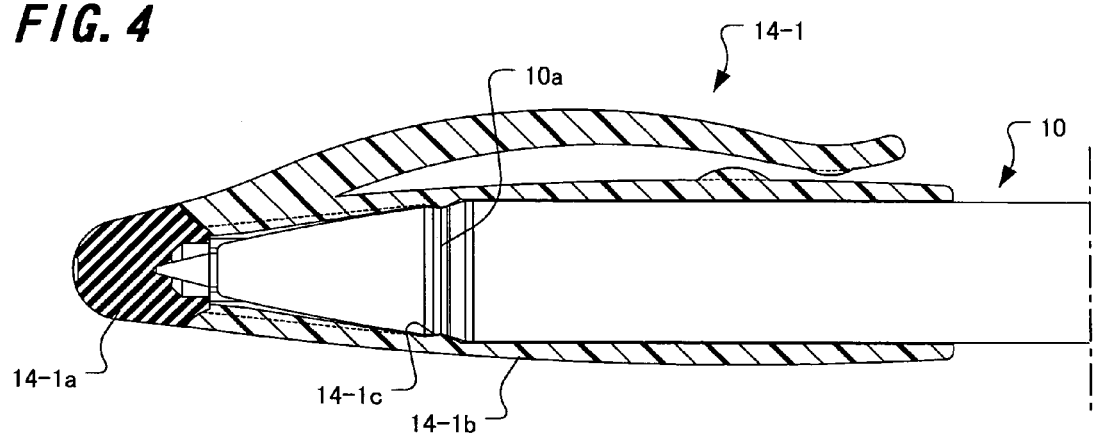
FIG. 4 is an enlarge vertical sectional view of the airtight cap structure of FIG. 3.
Figure 5:
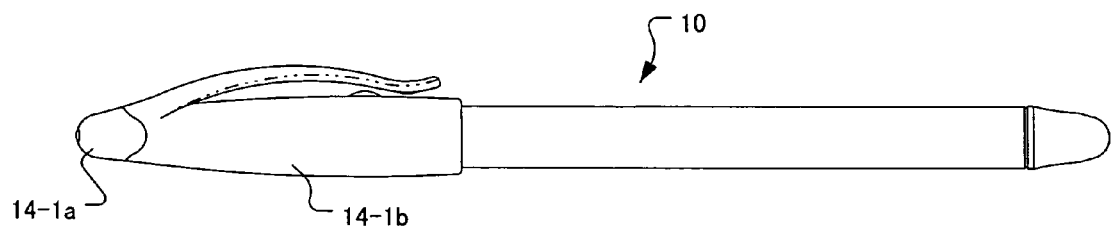
FIG. 5 is a whole view showing an external appearance of the writing tool adapting the airtight cap structure of FIG. 3.

FIGS. 3 to 5 are views adapting an airtight cap structure according to a second embodiment of the present invention to a writing tool in the figures, the same components as the first embodiment are attached with the reference numbers, and the description thereof will be omitted.

In a cap 14-1 according to this embodiment, a soft portion 14-1 comprised of an elastic soft resin configures internal and external surface portions of the top portion of the cap 14-1, and a hard portion 14-1b configures the other portion except for the top portion.

A circular engaging protrusion 14-1c is formed in the internal peripheral surface of the hard portion 14-1b, and the engaging protrusion 14-1c can engage with a circular engaging portion 10a formed in the corresponding portion of a main body 10.

In the cap structure configures as described above, when the use end portion 12a is not used and the cap 14-1 is attached to it, the engaging protrusion 14-1c of the hard portion 14-1b is engaged with the engaging portion 10a and the attaching state can be maintained. In this state, the use end portion 12a is inserted into the elastic soft portion 14-1a configuring the top portion of the cap 14-1 so as to make a direct contact to be sealed, and therefore, air-tightness of the refill 12 can be secured.

The soft portion 14-1a is exposed to the outside of the cap 14-1 so as to configure the external appearance of the cap 14-1, and a shape and a color of this exposed portion of the soft portion 14-1a are appropriately set so that the freedom of the design can be broadened, and the design property of the cap 14-1 can be enhanced.

Figure 6:
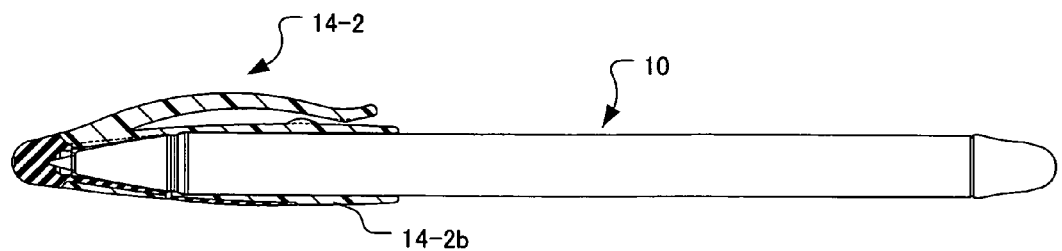
FIG. 6 is a partially sectional whole view of the writing tool adapting the airtight cap structure according to the third embodiment of the present invention.
Figure 7:
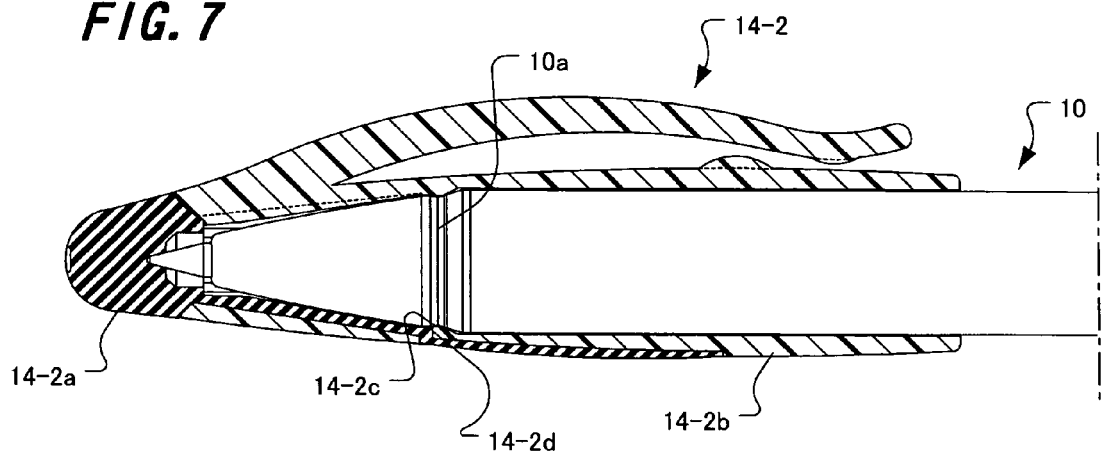
FIG. 7 is an enlarged vertical sectional view of the airtight cap structure of FIG. 6.
Figure 8:
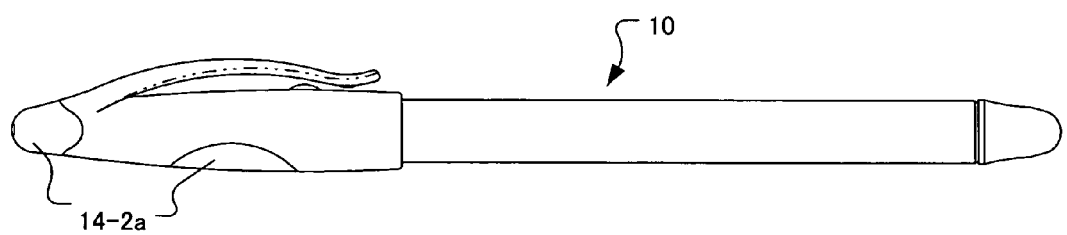
FIG. 8 is a whole view showing the external appearance of the writing tool adapting the airtight cap structure of FIG. 6.

FIGS. 6 to 8 are views showing an example of adapting an airtight cap structure according to a third embodiment of the present invention to a writing tool. In the figures, the same components as the first embodiment are attached with the same reference numerals, and the description thereof will be omitted.

In a cap 14-2 according to this embodiment, a soft portion 14-2a comprised of an elastic soft resin configures a top portion, a portion of an internal surface, and a portion of an external surface portion of the cap 14-2, and a hard portion 14-2b configures the other portion.

The soft portion 14-2a extends continuously from the top portion to the portion of the internal surface portion, and further to the portion of the external surface portion, and the portion of the internal surface portion and the portion of the external surface portion are connected through a communicating portion 14-2d which penetrates into the hard portion 14-2b.

A circular engaging protrusion 14-2c is formed on the internal peripheral surface of the hard portion 14-2b, and the engaging protrusion 14-2 can engage with a circular engaging portion 10a formed in the corresponding portion of the main body 10.

In the cap structure configured as describe above, similarly to the second embodiment, when the use end portion 12a is not used and the cap 14-2 is attached to it, the engaging protrusion 14-2c of the hard portion 14-2b is engaged with the engaging portion 10a and the attaching state can be maintained. In this state, since the use end portion 12a is inserted into the soft portion 14-2a configuring the top portion of the cap 14-2 to make a direct contact to be sealed, air-tightness of a refill 12 can be secured.

The soft portion 14-2a is exposed to the outside of the cap 14-2 so as to configure the external appearance of the cap 14-2, and in particular, the soft portion 14-2a is exposedly arranged so as to be separated into the top portion and the portion of the external peripheral surface in the outside of the cap 14-2, and appropriately setting a shape and a color of this exposed portion of the soft portion 14-2a broaden the freedom of the width of the design, and the design property of the cap 14-2 can be enhanced.

Figure 9:
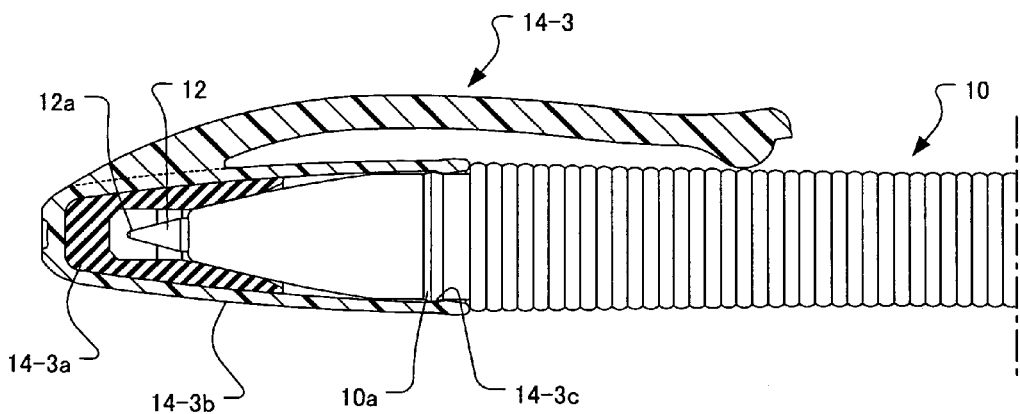
FIG. 9 is an enlarged vertical sectional view of an airtight cap structure according to a fourth embodiment of the present invention.

FIG. 9 is an enlarged vertical longitudinal sectional view of an airtight cap structure according to a fourth embodiment of the present invention. In the figure, the same components as the first embodiment are attached with the same reference numerals, and the detailed description thereof will be omitted.

In a cap 14-3 according to this embodiment, a soft portion 14-3a comprised of an elastic soft resin configures a portion of the internal surface portion of the top portion of the cap 14-3, and a hard portion 14-3b configures the other portion.

A circular engaging protrusion 14-3c is formed on the internal peripheral surface of the hard portion 14-3b, and the engaging protrusion 14-3c can engage with an engaging portion 1a formed in the corresponding portion of a main body 10.

This embodiment is different from the first embodiment is that, in an attaching state, a use end portion 12a does not directly contact the soft portion 14-3a, and in stead of that, the tip end portion of the main body 10 and the soft portion 14-3a are directly brought into contact. Even in such a configuration, since the use end portion 12a of a refill 12 is confined within an airtight space, air-tightness of the refill 12 can be secured.

Figure 10:
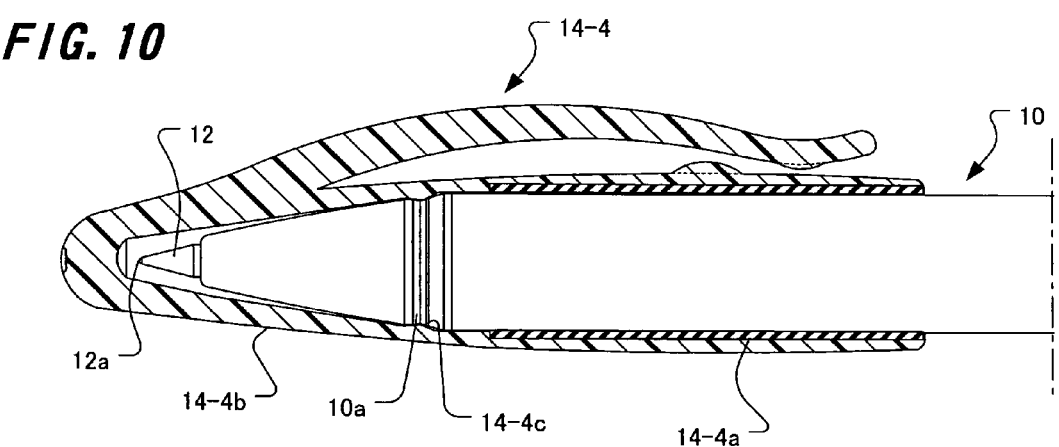
FIG. 10 is an enlarged vertical sectional view of an airtight cap structure according to a fifth embodiment of the present invention.

FIG. 10 is an enlarged vertical longitudinal sectional view of an airtight cap structure according to a fifth embodiment of the present invention. In the figure, the same components as the first embodiment are attached with the same reference numerals, and the detailed description thereof will be omitted.

In a cap 14-4 according to this embodiment, a soft portion 14-4a comprised of an elastic soft resin configures a portion of an internal surface portion in the vicinity of a free end portion of the cap 14-4, and a hard portion 14-4b configures the other portion.

A circular engaging protrusion 14-4c is formed on the internal peripheral surface of the hard portion 14-4b, and the engaging protrusion 14-4c can engage with an engaging portion 10a formed in the corresponding portion of a main body 10.

In this embodiment also, in an attaching state, a use end portion 12a does not directly contact the soft portion 14-4a, and in stead of that, the tip end portion of the main body 10 and the soft portion 14-4a are directly brought into contact. However, since a use end portion 12a of a refill 12 is confined within an airtight space, air-tightness of the refill 12 can be secured.

Figure 11:
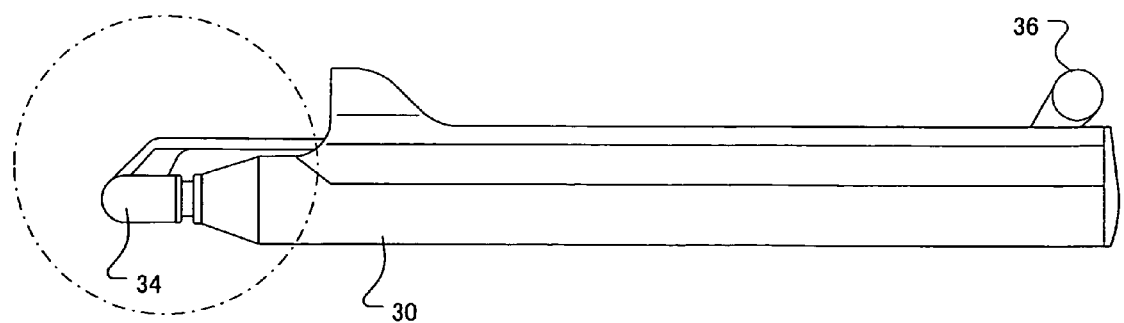
FIG. 11 is a whole view of a writing tool adapting an airtight cap structure according to a sixth embodiment of the present invention.
Figure 12:
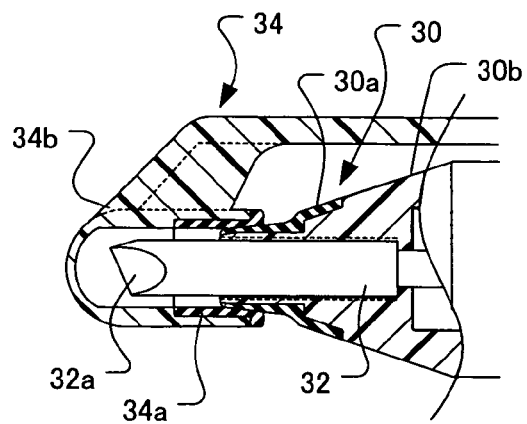
FIG. 12 is an enlarged vertical sectional view of an airtight cap structure according to a sixth embodiment of the present invention.

FIG. 11 is a whole view of a writing tool adapting an airtight cap structure according to a sixth embodiment of the present invention, and FIG. 12 is an enlarged vertical longitudinal view of the main part.

In the figures, this writing tool generally has a main body 30, a cap 34, and an operating portion 36. The main body 30 has a refill 32 as a writing body in its interior, and in the tip end of the main body 30, a use end portion 32a of the tip end of a refill 32 is exposed. The operating portion 36 and the cap 34 are connected through a rotation converting mechanism, and when the operation portion 36 is knocked, the cap 34 advances, and after that, the cap 34 rotates around an axis parallel to the longitudinal direction of the main body 30, and then, the cap 34 retreats. Hence, for every knocking of the operating portion 36, it is possible to switch a state in which the cap 34 covers the use end portion 32a of the refill 32 with a state in which the cap 34 exposes the use end portion 32a.

Since such a cap 34 is not attached and detached manually, but the attachment and detachment of the cap 34 are indirectly performed by the operation of the operating portion 36, the engaging protrusion and the like provided in the preceding embodiments cannot be provided on the cap and the main body side of this embodiment, and it becomes important that air-tightness can be automatically and reliably secured between the cap 34 and the use end portion 32a just by simply putting the cap 34 on.

Hence, in this embodiment, the cap 34 is configured by two-color molding of a soft portion 34 comprised of an elastic soft resin and a hard portion 34b comprised of a hard resin, and the soft portion 34a configures only one portion of the internal surface portion of the cap 34, and the hard portion 34b configures the other portion of the cap 34 except for the one portion. In addition, a housing of the main body 30 also is configured by two-color molding of a soft portion 30a comprised of an elastic soft resin and a hard portion 30b comprised of a hard resin. In this example, the soft portion 30a configures the tip end portion only in the vicinity of the use end portion 32a, and the hard portion 30b configures the other housing portion except for the tip portion.

In the cap structure configured as described above, when the use end portion 32a is not used and the operating portion 36 is knocked, the cap 34 is attached to the use end portion 32a and the soft portion 34a of the cap 34 is directly brought into contact with the soft portion 30a of the main body 30. As a result, even if an eccentricity between the cap 34 and the main body 30 occurs, both soft portions thereof are reliably and closely brought into contact by utilizing the mutual elasticity, and therefore, the use end portion 32a of the refill 32 is confined within an airtight space, and air-tightness of the refill 32 can be secured.

Figure 13:
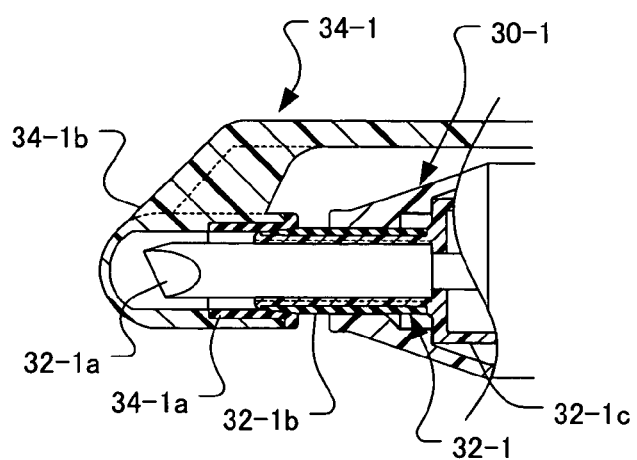
FIG. 13 is an enlarged vertical sectional view of an airtight cap structure according to a seventh embodiment of the present invention.

FIG. 13 is a vertical longitudinal sectional view of a writing tool adapting an airtight cap structure according to a seventh embodiment of the present invention. In the figures, the same components as the sixth embodiment are attached with the reference numbers, and the description thereof will be omitted.

In this embodiment, a cap 34-1 is configured by two-color molding of a soft portion 34-1a comprised of an elastic soft resin and a hard portion 34-1b comprised of a hard resin, and the soft portion 34-1a configures only one portion of the internal surface portion of the cap 34-1, and a hard portion 34-1b configures the other portion of the cap 34-1 except for the one portion. In addition, a housing of a refill 32-1 that is a writing body, the housing retaining the periphery of a use end portion 32-1a and retaining a writing ink in its interior, is configured by two-molding of a soft portion 32-1b comprised of an elastic soft resin and a hard portion 32-1c comprised of a hard resin, and in this example, the soft portion 32-1b configures the tip end portion only in the vicinity of the use end portion 32-1a, and the hard portion 32-1c configures the other housing portion except for the tip portion. The soft portion 32-1b and the hard portion 32-1c of the refill 32-1 are protruded from the housing of a main body 30-1.

In the cap structure configured as described above, when the use end portion 32-1a is not used and the operating portion 36 is knocked, the cap 34 is attached to the use end portion 32-1a and the soft portion 34-1a of the cap 34 is directly brought into contact with the soft portion 32-1b of the refill 32-1. Hence, since both soft portions are reliably and closely brought into contact by utilizing the mutual elasticity, the use end portion 32-1a of the refill 32-1 is confined within an airtight space, and air-tightness of the refill 32-1 can be secured.

Figure 14:
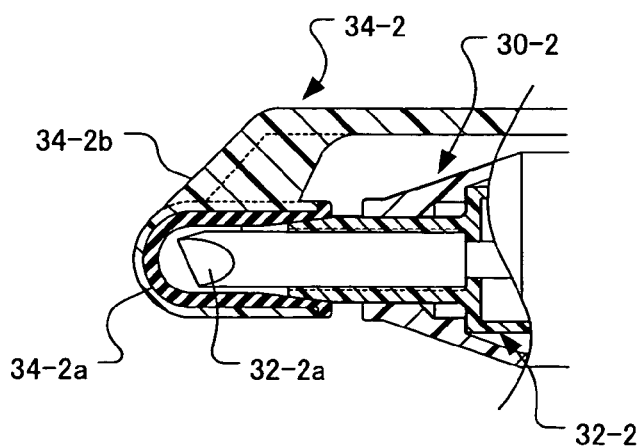
FIG. 14 is an enlarged vertical sectional view of an airtight cap structure according to an eighth embodiment of the present invention.

FIG. 14 is a vertical longitudinal sectional view of a writing tool adapting an airtight cap structure according to an eighth embodiment of the present invention. In the figures, the same components as the sixth embodiment are attached with the reference numbers, and the description thereof will be omitted.

In this embodiment, a cap 34-2 is configured by two-color molding of a soft portion 34-2a comprised of an elastic soft resin and a hard portion 34-2b comprised of a hard resin, and the soft portion 34-2a configures the whole internal surface portion of the cap 34-2, and a hard portion 34-2b configures the other portion of the cap 34-2. A refill 32-2 is protruded from the housing of a main body 30-2.

In the cap structure configured as described above, when the use end portion 32-2a of the refill 32-2 is not used and an operating portion 36 is knocked, the cap 34-2 is attached to a use end portion 32-2a. Since the soft portion 34-2a of the cap 34-2 contacts the tip end of the refill 32-2, the use end portion 32-2a of the refill 32-2 can be confined within an airtight space, and air-tightness of the refill 32-2 can be secured.

It should be noted that, in the above described embodiments, while the cap has been always configured by two-color molding of the soft portion and the hard portion, the invention is not limited to this, and a configuration may be such that the cap includes only the hard portion, and at least one component of the main body including the writing body is configured by two-color molding of the soft portion and the hard portion, and that soft portion is allowed to contact the hard portion of the cap so as to secure a sealing property.

While the principles of the invention have been described above in connection with specific embodiments, and particular modifications thereof, it is to be clearly understood that this description is made only by way of example and not as a limitation on the scope of invention.

What is claimed is:

1. An airtight cap structure, comprising:

a cap; and a use end portion of an end portion of a main body, said use end portion detachably covered by the cap such that drying up of the use end portion is prevented, wherein at least one of the cap and a vicinity of the use end portion of the main body comprises:

a soft portion comprising an elastic soft resin; and a hard portion comprising a hard resin, wherein, in a state in which the cap is attached to the main body, said soft portion of the one of the cap and the vicinity of the use end portion of the main body contacts a corresponding surface of an other one of the cap and the main body such that an air tight seal is formed between said soft portion and said corresponding surface, wherein said soft portion comprises a first part of an internal surface portion and a first part of an external surface portion of the cap, wherein the first part of the internal surface portion and the first part of the external surface portion are connected with each other through a communicating portion penetrating into the hard portion, and wherein said hard portion comprises a second part of the internal surface portion of the cap and a second part of the external surface portion of the cap.

2. The airtight cap structure according to claim 1, wherein said soft portion extends from a top portion to the first part of the internal surface portion and further extends to the first part of the external surface portion.

3. An airtight cap structure, comprising:

a cap; and a use end portion of an end portion of a main body, said use end portion detachably covered by the cap such that drying up of the use end portion is prevented, wherein at least one of the cap and a vicinity of the use end portion of the main body comprises:

a soft portion comprising an elastic soft resin; and a hard portion comprising a hard resin, wherein, in a state in which the cap is attached to the main body, said soft portion of the one of the cap and the vicinity of the use end portion of the main body contacts a corresponding surface of an other one of the cap and the main body such that an air tight seal is formed between said soft portion and said corresponding surface, wherein said soft portion comprises a first part of an internal surface portion of the cap, and wherein a hard portion of the cap is formed with a main body engaging portion that engages a cap engaging portion of the main body during the state in which the cap is attached to the main body.

4. The airtight cap structure according to claim 3, wherein said cap engaging portion comprises a hard portion of said main body comprising said hard resin.

5. The airtight cap structure according to claim 3, wherein said soft portion contacts said use end portion of said main body.

* * * * *